(12) United States Patent
Takeuchi et al.

(10) Patent No.: US 7,891,137 B2
(45) Date of Patent: Feb. 22, 2011

(54) VEHICLE DOOR FRAME AND METHOD FOR MAKING THE SAME

(75) Inventors: Katsuhiko Takeuchi, Aichi-ken (JP); Koji Yoshida, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 351 days.

(21) Appl. No.: 11/992,950

(22) PCT Filed: Oct. 4, 2006

(86) PCT No.: PCT/JP2006/319833

§ 371 (c)(1),
(2), (4) Date: Apr. 2, 2008

(87) PCT Pub. No.: WO2007/040237

PCT Pub. Date: Apr. 12, 2007

(65) Prior Publication Data

US 2009/0115220 A1    May 7, 2009

(30) Foreign Application Priority Data

Oct. 5, 2005    (JP) .............................. 2005-292879

(51) Int. Cl.
*B60J 5/04* (2006.01)
*E06B 3/00* (2006.01)

(52) U.S. Cl. .................... 49/502; 49/506; 296/146.5
(58) Field of Classification Search .................. 49/502, 49/348, 349, 352, 506; 296/146.5, 146.2; 29/897.2

See application file for complete search history.

(56) References Cited

U.S. PATENT DOCUMENTS

| 5,375,314 | A * | 12/1994 | Bora ........................ 29/402.13 |
| 5,735,081 | A * | 4/1998 | Yamanaka et al. ............. 49/506 |
| 7,386,938 | B2 * | 6/2008 | Bruggemann et al. ....... 29/897.2 |
| 2002/0050064 | A1 * | 5/2002 | Furuse et al. ............... 29/897.2 |
| 2006/0181107 | A1 * | 8/2006 | Nishikawa ................ 296/146.2 |

FOREIGN PATENT DOCUMENTS

| JP | 62-4627 | 1/1987 |
| JP | 1-62922 | 4/1989 |
| JP | 4-39111 | 4/1992 |
| JP | 6-286463 | 10/1994 |
| JP | 2002-67694 | 3/2002 |
| JP | 2004-189164 | 7/2004 |

OTHER PUBLICATIONS

Chinese Office Action dated May 8, 2009.

* cited by examiner

*Primary Examiner*—Gregory J. Strimbu
(74) *Attorney, Agent, or Firm*—Finnegan, Henderson, Farabow, Garrett & Dunner, LLP

(57) ABSTRACT

A vehicle door frame includes a first frame and a second frame abutted against each other at abutting faces thereof at a predetermined angle. The abutting faces include first abutting faces provided in design portions and second abutting faces provided in hollow portions, respectively. The first abutting faces form a first angle with respect to the second abutting faces viewed from a first direction perpendicular to the design faces, respectively. The first abutting faces also form a second angle with respect to the second abutting faces when viewed from a direction perpendicular to the longitudinal direction of the frames and perpendicular to the first direction, respectively.

7 Claims, 4 Drawing Sheets

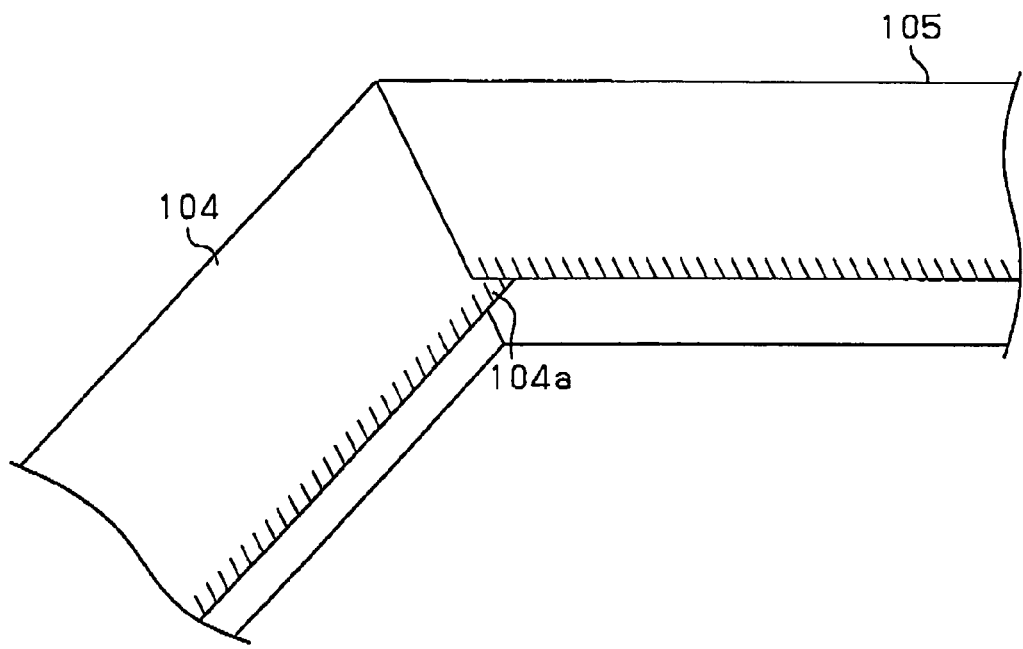

VEHICLE DOOR FRAME AND METHOD FOR MAKING THE SAME

FIELD OF THE INVENTION

The present invention relates to a vehicle door frame and a method for making a vehicle door frame.

BACKGROUND OF THE INVENTION

Generally, vehicle door includes a sash door having a door frame and a door body located on the lower side of the door frame, both formed separately. The door frame forms an opening that is selectively opened or closed by a window glass and the door frame and the door body. The sash door is formed, for example, by making the door frame of sash and welding the door frame with the door panel constituting the door body. In the case of the sash door, the door frame can be formed thinner than the case of the press door in which the door frame and the door body are formed integrally. Thus, in the sash door, the opening of the door frame can be made wider than in the press door.

Japanese Published Laid-Open Patent Publication No. 2002-67694 discloses a door frame of a sash door including a pillar extending obliquely upward from the door body and a main frame extending substantially horizontally from an upper end of the pillar.

Each of the pillar and the main frame includes a hollow portion, a design portion, and a flange portion. The hollow portion is disposed on the interior side of the vehicle with respect to the window glass. The design portion is disposed on the exterior side of the vehicle with respect to the window glass. The flange portion opposes the edge of the window glass and extends from the design portion to the hollow portion. In the pillar, the hollow portion, the design portion, and flange portion form a glass slide having a channel-like cross sectional configuration that opens toward the window glass with the flange portion located at the bottom of the slide, thereby guiding the window glass in the slide. In the main frame, the hollow portion, the design portion, and the flange portion form a glass fit having a channel-like cross sectional configuration that opens toward the window glass with the flange portion located at the bottom of the fit, thereby holding the window glass.

The glass slide of the pillar is formed deeper than the glass fit of the main frame so as to guide sliding of the window glass. Thus, the width of the design portion of the pillar is greater than that of the design portion of the main frame. When the pillar is joined with the main frame, the design portion of the pillar protrudes further than the design portion of the main frame on the side of the window glass, causing a difference in level of the joined portion of the design portions. Accordingly, conventionally, as illustrated in FIG. 6, an end of the pillar 104 has been processed to have a protrusion 104a protruding from the end of the pillar 104 to the main frame 105 so that the design portion of the pillar 104 and the design portion of the main frame 105 are joined without the difference in level.

By folding a metal plate having the design portion, folds are formed at the edge of the design portion of each of the pillar 104 and the main frame 105 in the width direction of the design portion. However, in the joined structure of FIG. 6, the folds (shaded portions in FIG. 6) of the design portions are not continued smoothly at the joined portion (abut portion) of the pillar 104 and the main frame 105. Thus, the joined portion of the pillar 104 and the main frame 105 is poor-looking. It is possible to perform welding to the joined portion to make the folds of the design portions continue smoothly, however, such welding is cumbersome. In addition, in order to form the protrusion 104a at the end of the pillar 104, an additional step such as pressing is required, which increases the number of steps for the process.

SUMMARY OF THE INVENTION

Accordingly, an object of the present invention is to provide a vehicle door frame that includes a design portion providing an aesthetic pleasing appearance and that can be easily made, and a method for making a vehicle door frame.

To achieve the above object, in one aspect of the present invention, a vehicle door frame including a first frame and a second frame abutted against each other at abutting faces thereof to form a predetermined angle is provided. Each of the first frame and the second frame comprises a plate-like design portion including a design face and a predetermined width; a flange portion extending from the design portion on the opposite side of the design face; and a hollow portion provided at a distal end of the flange portion, the hollow portion including a hollow cross-sectional area. The width of the design portion of the first frame differs from the width of the design portion of the second frame. In each of the first frame and the second frame, the abutting face includes a first planer abutting face provided in the design portion and a second planer abutting face provided in the hollow portion. The first abutting face forms a first angle with respect to the second abutting face when viewed from a direction perpendicular to the design face and forms a second angle with respect to the second abutting face when viewed from a direction perpendicular to the longitudinal direction of the frame and the extending direction of the flange portion.

In another aspect of the present invention, a method for making a vehicle door frame is provided. The method comprises: roll forming a metal plate to form a first frame member and a second frame member, forming an abutting face on each of the end faces of the first frame member and the second frame member, and abutting the first abutting face and the second abutting face of the first frame member and the first abutting face and the second abutting face of the second frame member against each other to be welded. Each of the first frame member and the second frame member includes an end face, a design portion having a design face, a flange portion extending from the design portion to the opposite side of the design face, and a hollow portion provided at a distal end of the flange portion and including a hollow cross-sectional area. The width of the first frame member differs from the width of the second frame member. In each of the first frame member and the second frame member, the abutting face includes a first planer abutting face provided in the design portion and a second planer abutting face provided in the hollow portion. The first abutting face forms a first angle with respect to the second abutting face when viewed from a direction perpendicular to the design face and forms a second angle with respect to the second abutting face when viewed from a direction perpendicular to the longitudinal direction of the frame and the extending direction of the flange portion.

BRIEF DESCRIPTION OF THE DRAWINGS

FIG. 6 is a partial enlarged view of a conventional vehicle door frame.

DETAILED DESCRIPTION OF THE PREFERRED EMBODIMENTS

An embodiment of the present invention is described with reference to the drawings.

Figure 1:
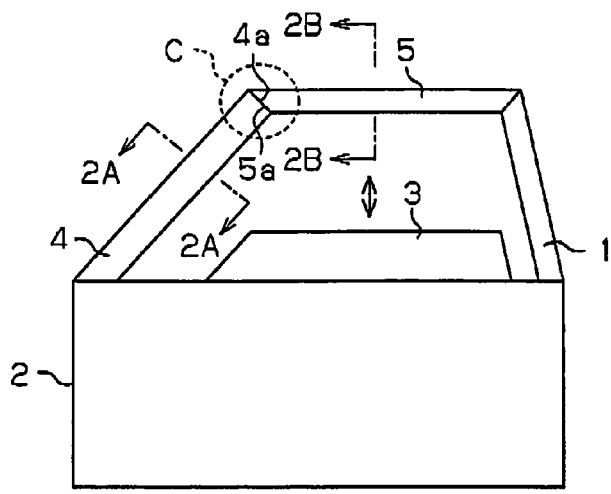
FIG. 1 is a schematic view of a vehicle door.

FIG. 1 is a schematic view of a vehicle door to which a vehicle door frame 1 according to the invention is adapted, viewed from the exterior side of the vehicle. As illustrated in FIG. 1, the vehicle door includes a door frame 1 and a door body 2 located on the lower side of the door frame 1. The frame 1 has a channel-like cross sectional configuration and extends along the contour of an upper side of the vehicle door. The door body 2 incorporates a window regulator (not shown) that moves a window glass 3 in the vertical direction (in an up and down direction in FIG. 1) and opens or closes an opening formed by the door frame 1 and the door body 2.

The door frame 1 includes a pillar 4 extending obliquely upward from the door body 2 (referred to as a first frame 4 hereinafter) and a main frame 5 extending 4 substantially horizontally from an upper end of the pillar 4 along the upper edge of the window glass 3 (referred to as a second frame 5 hereinafter). The end faces of the first frame 4 and the second frame 5 define abutting faces 4a and 5b that abut against each other.

Figure 2A:
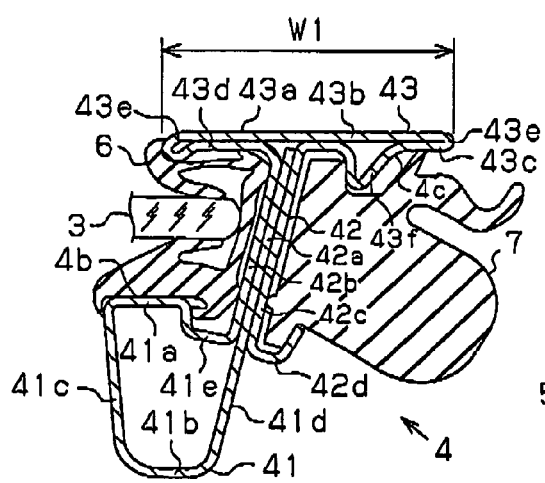
FIG. 2(a) is an enlarged cross-sectional view of a first frame taken along the line 2A-2A in FIG. 1.
Figure 2B:
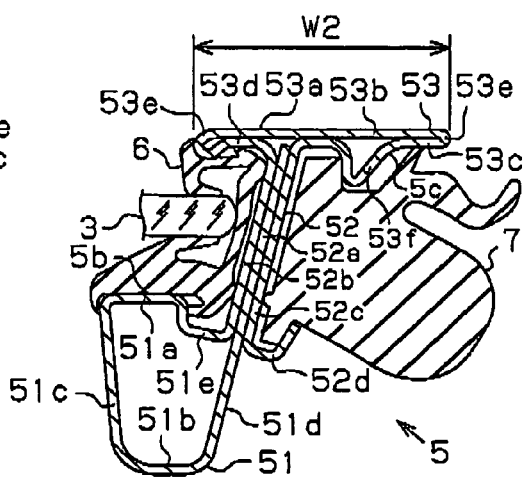
FIG. 2(b) is an enlarged cross-sectional view of a second frame taken along the line 2B-2B in FIG. 2.

FIGS. 2(*a*) and 2(*b*) are cross-sectional views of the first frame 4 and the second frame 5, respectively. In FIGS. 2(*a*) and 2(*b*), left is the side of the window glass 3 and right is the side of the vehicle body. Also in FIGS. 2(*a*) and (*b*), the upper side is the exterior side of the vehicle and the lower side is the interior side of the vehicle.

As illustrated in FIG. 2(*a*), the first frame 4 includes a hollow portion 41, a flange portion 42 extending in the thickness direction of the window glass 3, and a plate-like design portion 43 the thickness direction of which is the same as that of the window glass 3. The first frame 4 is formed by bending a metal plate. Thus, the hollow portion 41, the flange portion 42, and the design portion 43 are a single piece.

The hollow portion 41 includes a first wall 41a opposing the window glass 3 and disposed on the interior side of the vehicle with respect to the window glass 3, a second wall 41b opposing the first wall 41a and disposed on the interior side of the vehicle with respect to the first wall 41a, a first connecting wall 41c for connecting an end of the first wall 41a and an end of the second wall 41b on the side of the window glass 3, and a second connecting wall 41d for connecting an end of the first wall 41a and an end of the second wall 41b on the side of the vehicle body. The walls 41a to 41d define a hollow space extending in the longitudinal direction of the first frame 4.

The flange portion 42 is plate-like and opposes an end of the window glass 3. The flange portion 42 has a three-layer configuration including a first flange portion 42a extending from the second connecting wall 41d of the hollow portion 41, a second flange portion 42b disposed on the side of the window glass 3 with respect to the first flange portion 42a, and a third flange portion 42c disposed on the side of the vehicle body with respect to the first flange portion 42a.

The design portion 43 includes a main portion 43b having a design face 43a that is disposed at the end of the flange portion 42 and exposed to the exterior side of the vehicle, a first underlying portion 43c extending from an end of the flange portion 42 toward the vehicle body along the main portion 43b, and a second underlying portion 43d extending from an end of the flange portion 42 toward the window glass 3 along the main portion 43b. The design portion 43 has a dual structure comprised of the main portion 43b and the first underlying portion 43c on the vehicle body side of the flange portion 42 and a dual structure comprised of the main portion 43b and the second underlying portion 43d on the window glass side of the flange portion 42. The first underlying portion 43c and the second underlying portion 43d are formed by folding back the metal plate forming the first frame 4 at both edges of the design portion 43. Thus, one fold 43e is formed between one edge of the design portion 43 and the first underlying portion 43c and the other fold 43e is formed between the other edge of the design portion 43 and the second underlying portion 43d. The first underlying portion 43c, the second underlying portion 43d, the folds 43e, and the main portion 43b are continuous.

The first frame 4 includes a glass slide 4b onto which a glass seal 6 is provided and a weatherstrip fit 4c onto which a weatherstrip 7 is provided. Each of the glass slide 4b and the weatherstrip fit 4c defines a recess extending in the longitudinal direction of the first frame 4.

The glass slide 4b is formed from the first wall 41a of the hollow portion 41, the second flange portion 42b of the flange portion 42, and the second underlying portion 43d of the design portion 43. The glass slide 4b is located on the same side of the window glass 3 with respect to the flange portion 42. The first wall 41a of the hollow portion 41 and the second underlying portion 43d of the design portion 43 oppose the thickness direction of the window glass 3. The glass slide 4b opens toward the window glass 3 with the second flange portion 42b located at the bottom of the glass slide 4b.

A proximal end of the first wall 41a includes a depressed portion, or a first engaging portion 41e. The fold 43e of the second underlying portion 43d is bent toward the interior side of the vehicle. The glass seal 6 is held in the glass slide 4b by engaging with the first engaging portion 41e and the fold 43e of the second underlying portion 43d. The window glass 3 is slidably supported in the glass slide 4b via the glass seal 6.

The weatherstrip fit 4c is formed from the third flange portion 42c of the flange portion 42, the first underlying portion 43c of the design portion 43, and a bend 42d extending from an interior side end of the third flange portion 42c. The weatherstrip fit 4c is located on the same side of the vehicle body with respect to the flange portion 4. A second engaging portion 43f protrudes from the first underlying portion 43c of the design portion 43 and a distal end of the bend 42d is folded back toward the second engaging portion 43f. The weatherstrip 7 is held in the weatherstrip fit 4c by engaging with the second engaging portion 43f and the bend 42d.

As illustrated in FIG. 2(*b*), the second frame 5 includes a hollow portion 51, a flange portion 52 extending in the thickness direction of the window glass 3, and a plate-like design portion 53 the thickness direction of which is the same as that of the window glass 3. The second frame 5 is formed by bending a metal plate. Thus, the hollow portion 51, the flange portion 52, and the design portion 53 are a single piece.

The hollow portion 51 include a first wall 51a opposing the window glass 3 and disposed on the interior side of the vehicle with respect to the window glass 3, a second wall 51b opposing the first wall 51a and disposed on the interior side of the vehicle with respect to the first wall 51a, a first connecting wall 51c for connecting an end of the first wall 51a and an end of the second wall 51b on the side of the window glass 3, and a second connecting wall 51d for connecting an end of the first wall 51*a* and an end of the second wall 51*b* on the side of the vehicle body. The walls 51*a* to 51*d* define a hollow space extending in the longitudinal direction of the second frame 5.

The flange portion 52 is plate-like and opposes an end of the window glass 3. The flange portion 52 has a three-layer configuration including a first flange portion 52*a* extending from the second connecting wall 51*d* of the hollow portion 51, a second flange portion 52*b* disposed on the side of the window glass 3 with respect to the first flange portion 52*a*, and a third flange portion 52*c* disposed on the side of the vehicle body with respect to the first flange portion 52*a*.

The design portion 53 includes a main portion 53*b* having a design face 53*a* that is disposed at the end of the flange portion 52 and exposed to the exterior side of the vehicle, a first underlying portion 53*c* extending from an end of the flange portion 52 toward the vehicle body along the main portion 53*b*, and a second underlying portion 53*d* extending from an end of the flange portion 52 toward the window glass 3 along the main portion 53*b*. The design portion 53 has a dual structure comprised of the main portion 53*b* and the first underlying portion 53*c* on the vehicle body side of the flange portion 52 and a dual structure comprised of the main portion 53*b* and the second underlying portion 53*d* on the window glass side of the design flange portion 52. The first underlying portion 53*c* and the second underlying portion 53*d* are formed by folding back the metal plate forming the second frame 5 at both edges of the design portion 53. Thus, one fold 53*e* is formed between one edge of the design portion 53 and the first underlying portion 53*c* and the other fold 53*e* is formed between the other edge of the design portion 53 and the second underlying portion 53*d*. The first underlying portion 53*c*, the second underlying portion 53*d*, the folds 53*e*, and the main portion 53*b* are continuous.

The second frame 5 includes a glass fit 5*b* onto which a glass seal 6 is provided and a weatherstrip fit 5*c* onto which a weatherstrip 7 is provided. Each of the glass fit 5*b* and the weatherstrip fit 5*c* defines a recess extending in the longitudinal direction of the second frame 5.

The glass fit 5*b* is formed from the first wall 51*a* of the hollow portion 51, the second flange portion 52*b* of the flange portion 52, and the second underlying portion 53*d* of the design portion 53. The glass fit 5*b* is located on the same side of the window glass 3 with respect to the flange portion 52. The first wall 51*a* of the hollow portion 51 and the second underlying portion 53*d* of the design portion 53 oppose in the thickness direction of the window glass 3. The glass fit 5*b* opens to the window glass 3 with the second flange portion 52*b* located at the bottom of the glass fit 5*b*.

A proximal end of the first wall 51*a* includes a depressed portion, or a first engaging portion 51*e*. The fold 53*e* of the second underlying portion 53*d* is bent toward the interior side of the vehicle. The glass seal 6 is held in the glass fit 5*b* by engaging with the first engaging portion 51*e* and the fold 53*e* of the second underlying portion 53*d*. The window glass 3 is slidably supported in the glass fit 5*b* via the glass seal 6.

The weatherstrip fit 5*c* is formed from the third flange portion 52*c* of the flange portion 52, first underlying portion 53*c* of the design portion 53, and a bend 52*d* extending from an interior side end of the third flange portion 52*c*. The weatherstrip fit 5*c* is located on the same side of the vehicle body with respect to the flange portion 52. A second engaging portion 53*f* protrudes from the first underlying portion 53*c* of the design portion 53 and a distal end of the bend 52*d* is folded back toward the second engaging portion 53*f*. The weatherstrip 7 is held in the weatherstrip fit 5*c* by engaging with the second engaging portion 53*f* and the bend 52*d*.

The depth of the glass slide 4*b* of the first frame 4 is greater than that of the glass fit 5*b* of the second frame 5. That is, a width W1 of the design portion 43 of the first frame 4 is greater than a width W2 of the design portion 53 of the second frame 5. The widths W1 and W2 are the dimensions in a direction perpendicular to the longitudinal direction of the first frame 4 and the second frame 5, respectively.

Next, the abutting faces 4*a* and 5*b* of the first frame 4 and the second frame 5 are described with reference to FIGS. 3(*a*) and 3(*b*). Each of the abutting faces 4*a* and 5*b* forms a predetermined angle with respect to the longitudinal direction of the corresponding one of the frames 4 and 5. The first frame 4 and the second frame 5 are abutted against each other at the abutting faces 4*a* and 5*b*.

Figure 3A:
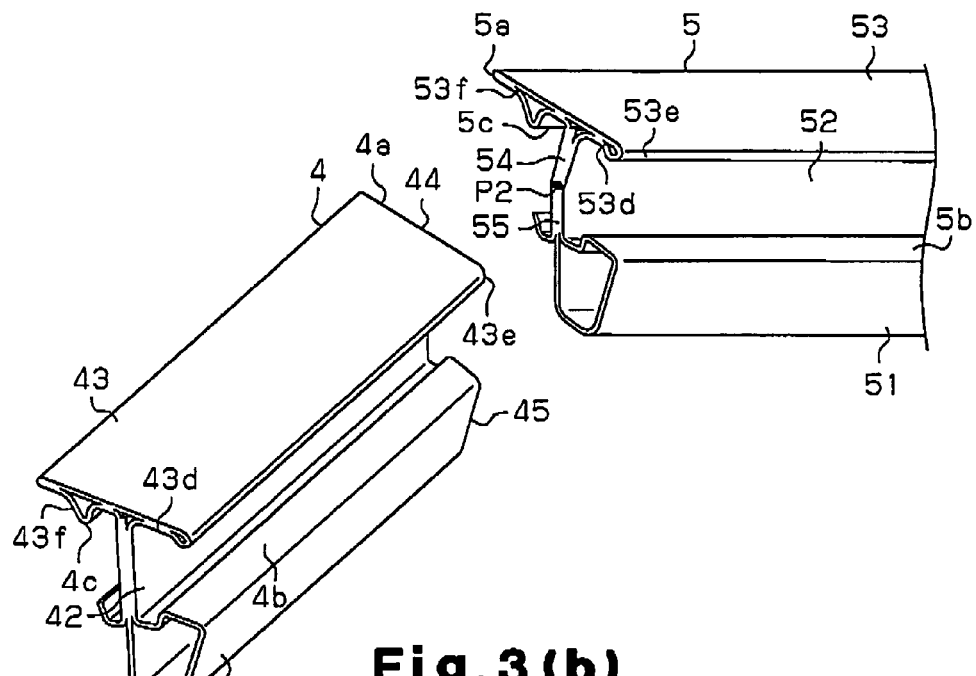
FIG. 3(a) is a partial perspective view of the first frame.
Figure 3B:
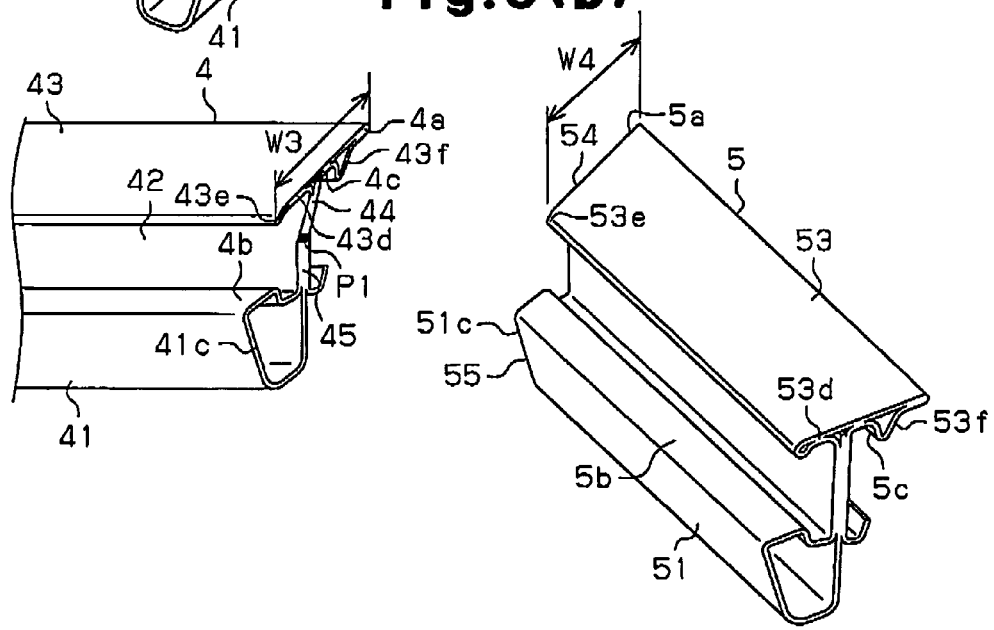
FIG. 3(*b*) is a partial perspective view of the second frame.
Figure 4:
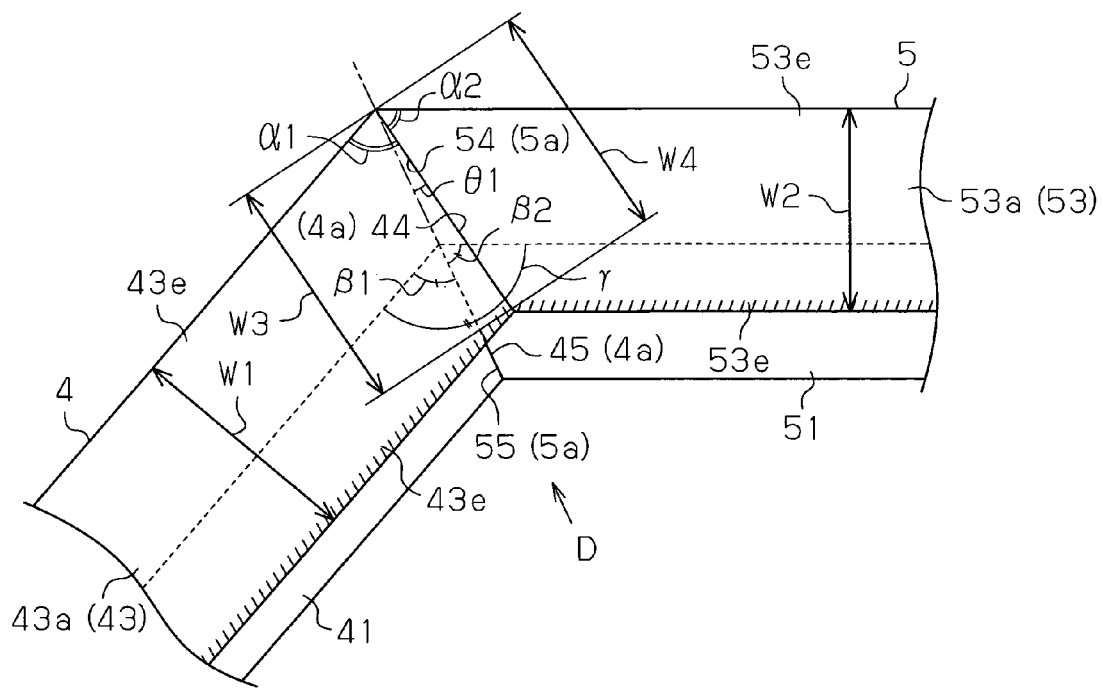
FIG. 4 is an enlarged view of the part enclosed by the dashed circle C of FIG. 1.

FIGS. 3(*a*) and 3(*b*) are perspective views of an end of first frame 4 and an end of the second frame 5. FIG. 4 is an enlarged view of the joined part of the first frame 4 and the second frame 5 (the part enclosed by the dashed circle C of FIG. 1) viewed from the exterior side of the vehicle.

As illustrated in FIGS. 3(*a*) and 3(*b*), the abutting faces 4*a* and 5*b* include planar first abutting faces 44 and 54 corresponding to the design portions 43 and 53, and planar second abutting faces 45 and 55 corresponding to the hollow portions 41 and 51, respectively. As illustrated in FIG. 3(*b*), in the abutting face 4*a* of the first frame 4, a portion that is on the side of the design portion 43 with respect to a middle point P1 in the extending direction of the flange portion 42 forms the first abutting face 44 and a portion that is on the side of the hollow portion 41 with respect to the middle point P1 forms the second abutting face 45. Similarly, as illustrated in FIG. 3(*a*), in the abutting face 5*a* of the second frame 5, a portion that is on the side of the design portion 53 with respect to a middle point P2 in the extending direction of the flange portion 52 forms the first abutting face 54 and a portion that is on the side of the hollow portion 51 with respect to the point P2 forms the second abutting face 55.

As illustrated in FIG. 4, when viewed from a direction perpendicular to the design face 43*a*(53*a*), the first abutting face 44 (54) forms a first angle θ1 with respect to the second abutting face 45 (55).

In particular, when viewed from a direction perpendicular to the design faces 43*a* and 53*a*, the first abutting faces 44 and 54 form the third angles α1 and α2 with respect to the longitudinal axis of the first frame 4 and the second frame 5 so that the length W3 of the first abutting face 44 in the design portion 43 and the length W4 of the first abutting face 54 in the design portion 53 become equal. The angle α1 is represented in the following equation as:

$$\sin \alpha 1 = W1/W3$$

The angle α2 is represented in the following equation as:

$$\sin \alpha 2 = W2/W4.$$

As noted above, the length W3 of the first abutting face 44 in the design portion 43 and the length W4 of the second abutting face 55 in the design portion 53 are the same. Accordingly, the following equation may be derived:

$$\sin \alpha 1/\sin \alpha 2 = W1/W2.$$

The angles α1 and α2 can be determined by the widths W1 and W2 of the design portions 43 and 53, respectively.

When the first frame 4 and the second frame 5 are abutted against each other at the abutting faces 4*a* and 5*b*, the hollow portion 41 of the first frame 4 and the hollow portion 51 of the second frame 5 are abutted against each other. As illustrated in FIG. 4, when viewed in a direction perpendicular to the design faces 43*a* and 53*a*, the second abutting faces 45 and 55 form fourth angles β1 and β2 with respect to the longitudinal axis of the first frame 4 and the second frame 5, respectively. As described above, the hollow portion 41 and the hollow portion 51 have generally the same configuration. Thus, the angle β1 is equal to the angle β2. Accordingly, the following equation is satisfied:

$$\sin β1/\sin β2=1 \text{(constant)}.$$

The angles β1 and β2 are represented by the following formula:

$$β1+β2=2·β1(=2·β2)=γ$$

wherein the angle γ is an angle formed between the longitudinal axis of the first frame 4 and the longitudinal axis of the second frame 5 viewed from a direction perpendicular to the design faces 43a and 53a.

That is, the angles β1 and β2 are determined by the angle γ formed between the longitudinal axis of the first frame 4 and the longitudinal axis of the second frame 5 when viewed from a direction perpendicular to the design faces 43a and 53a.

Accordingly, in the first frame 4 and the second frame 5, when viewed from a direction perpendicular to the design faces 43a and 53a, there is a difference between the angles α1 and α2, which are the angles the first abutting faces 44 and 54 form with respect to the longitudinal axis of the frames 4 and 5, and the angles β1 and β2, which are the angles the second abutting faces 45 and 55 form with respect to the longitudinal axis of the frames 4 and 5. Thus, the abutting face 4a of the first frame 4 is configured so that the first and the second abutting faces 44 and 45 thereof form a first angle θ1 when viewed in a direction perpendicular to the design face 43a. Similarly, the abutting face 5a of the second frame 5 is configured so that the first and the second abutting faces 54 and 55 thereof form the first angle θ1 when viewed in a direction perpendicular to the design face 53a. The first angle θ1 is represented by the following equation:

$$θ1=α1-β1=β2-α2$$

Figure 5:
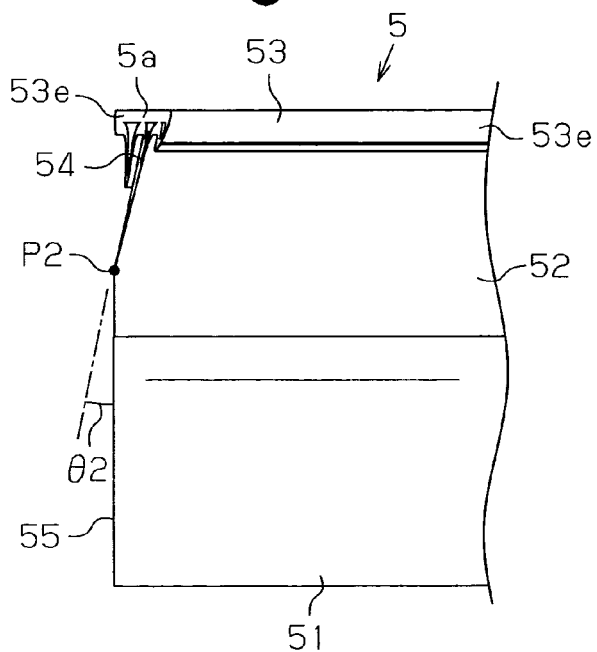
FIG. 5 is a partial side view of the second frame viewed from the direction D indicated by the arrow in FIG. 4.

As illustrated in FIG. 5, in the second frame 5, the second abutting face 55 is perpendicular to the design face 53a. Similarly, although not shown, in the first frame 4, the second abutting face 45 is perpendicular to the design face 43a. Meanwhile, in the first frame 5, the first abutting face 54 forms a second angle θ2 with respect to the second abutting face 55 when viewed from the direction D indicated by the arrow in FIG. 4, i.e., viewed in a direction perpendicular to the longitudinal direction of the frame 5 and the extended direction of the flange portion 52. Similarly, although not shown, in the first frame 4, the first abutting face 44 forms the second angle θ2 with respect to the second abutting face 45 when viewed in a direction perpendicular to the longitudinal direction of the frame 4 and the extended direction of the flange portion 42.

In order so that the first abutting face 44 (54) may form the second angle θ2 with respect to the second abutting face 45 (55), the first abutting face 44 (54) intersects with the second abutting face 45 (55) at the middle point P1 (P2) of the flange portion 42 (52). The difference in the longitudinal direction between the first abutting face 44 (54) and the second abutting face 45 (55) generated by the first angle θ1 is offset by setting the angle between the first abutting face 44 (54) and the second abutting face 45 (55) to the second angle θ2. Consequently, the first abutting face 44 (54) and the second abutting face 45 (55) may be connected without interference by any other face. That is, the abutting face 4a(5a) may be formed from the two continuous planes, i.e., the first and the second abutting faces 44 and 45 (54 and 55). The second angle θ2 is set so that the first abutting face 44 (54) intersect with the second abutting face 45 (55) at the middle points P1 (P2) of the flange portion 42 (52).

Next, a method for making the above-described door frame 1 is explained.

Roll forming is performed on metal plates and a first frame member and a second frame member (not shown) having the cross-sectional configuration as described above are prepared.

Next, an end of the design portion of each of the first frame member and the second frame member is cut to form first abutting faces 44 and 54. The second angle θ2 is set so that the first abutting faces 44 and 54 and the second abutting faces 45 and 55 intersect at the middle points P1 and P2 of the flange portions 42 and 52. Accordingly, when the first abutting faces 44 and 54 are formed, the possibility of interference by the tool with the hollow portions 41 and 51 is diminished.

By cutting the ends of the hollow portions of the first frame member and the second frame member, second abutting faces 45 and 55 are formed. Thus, a first frame 4 and a second frame 5 including the first abutting faces 44 and 54 and the second abutting faces 45 and 55 can be obtained. The second angle θ2 is set so that the first abutting faces 44 and 54 intersect with the second abutting faces 45 and 55 at the middle points P1 and P2 of the flange portion 42 and 52. Accordingly, when the second abutting faces 45 and 55 are formed, the possibility of interference by the tool with the design portions 43 and 53 is diminished.

Next, the first frame 4 and the second frame 5 are abutted against each other at the abutting faces 4a and 5b, i.e., at the first abutting faces 44 and 54 and the second abutting faces 45 and 55, and joined by welding. Since the length W3 of the first abutting face 4 in the design portion 43 of the first frame 4 and the length W4 of the first abutting face 54 in the design portion 53 of the second frame 5 are the same, the fold 43e and 53e at the side edge of the design portions 43 and 53 are continuously connected at the abutting faces 4a and 5b.

As described above, the present embodiment has the following advantages.

The first abutting face 44 of the first frame and the first abutting face 54 of the second frame are formed so that the length W3 in the design portion 43 and the length W4 in the design portion 53 becomes the same. Accordingly, when the first frame 4 and the second frame 5 are abut against each other, the folds 43e and 53e are continued smoothly (shaded portions in FIG. 4). Thus, the folds 43e and 53e of the design portions 43 and 53 can be continued smoothly without any special process at the joined portions of the design portions 43 and 53 and design portions 43 and 53 providing an aesthetic pleasing appearance can be formed easily.

The abutting faces 4a and 5b are formed from the two successive planes, i.e., the first abutting faces 44 and 54 and the second abutting faces 45 and 55. Accordingly, the abutting faces 4a and 5b of the first frame 4 and the second frame 5 may be formed easily by cutting.

The width W1 of the design portion 43 of the first frame 4 is greater than the width W2 of the design portion 53 of the second frame 5 so that the depth of the glass slide 4b for guiding the slide of the window glass 3 becomes greater than the depth of the glass fit 5b of the second frame 5. Thus, the guidance of the slide of the window glass 3 is ensured. Furthermore, the width W2 is smaller than the width W1. Thus, compared to the case where the width W1 and the width W2 are the same, a cross-sectional area defined by the door frame 1 can be increased.

The second abutting faces 45 and 55 are perpendicular to the design faces 43a and 53a. Thus, compared to the case where the second abutting faces 45 and 55 are not perpendicular to the design faces 43a and 53a, the cross-sectional areas of the second abutting faces 45 and 55 may be decreased. Accordingly, the area to be cut in the first frame 4 and the second frame 5 required for forming the second abutting faces 45 and 55 becomes small, which reduces the time needed for the process.

The boundary between the first abutting faces 44 and 54 and the second abutting faces 45 and 55 in the flange portions 42 and 52 are located the middle points P1 and P2 in the extending direction of the flange portions 42 and 52. Accordingly, when the abutting faces 4a and 5b are cut, possibility of interference by the tool with the hollow portions 41 and 51 or the design portions 43 and 53 is diminished.

The design portions 43 and 53 have multi-layer structure in their thickness direction by including the folds 43e and 53e. Thus, the rigidity of the design portions 43 and 53 to the load acting in the thickness direction of the design portions 43 and 53 can be improved. In addition, the folds 43e and 53e allow formation of the continuous faces extending from the design faces 43a and 53a to the opposite side of the design faces 43a and 53a, thereby providing an aesthetic pleasing appearance of the design portions 43 and 53.

The embodiment of the present invention may be modified as follows.

The design portions 43 and 53 and the flange portions 42 and 52 of the first frame 4 and the second frame 5 may be discontinuous. For example, the design portion(s) may be made a member different from the flange portion(s).

Other than the vehicle door in which the window glass 3 is moved in the vertical direction, the vehicle door frame 1 as exemplified by the present invention may be applied to the vehicle door including a double sliding window opened or closed with the window glass.

The boundary between the first abutting face 44 (54) and the second abutting face 45 (55) may be provided closer to the hollow portion 41 (51) than the middle point P1 (P2) of the flange portion 42 (52). In this configuration, the angle θ2 the first abutting face 44 (54) forms with respect to the second abutting face 45 (55) becomes smaller. Thus, the angle the first abutting face 44 (54) forms with respect to the design face 43a(53a) becomes closer to the right angle. For example, when the first abutting face 44 (54) is formed, the frame 4 (5) can be cut from a direction generally perpendicular to the design face 43a(53a). Accordingly, the abutting face 45 (55) can be formed easily.

The invention claimed is:

1. A vehicle door frame including a first frame member and a second frame member abutted against each other at abutting faces thereof, each of the first frame member and the second frame member comprising:
   a generally planar design portion including a design face and having a predetermined width;
   a flange portion extending from the design portion on a side of the design portion opposite the design face; and
   a hollow portion provided at a distal end of the flange portion, the hollow portion including a hollow cross-sectional area;
   wherein
   the width of the design portion of the first frame member differs from the width of the design portion of the second frame member, and
   in each of the first frame member and the second frame member, the abutting face includes a first planer abutting face provided in the design portion and a second planer abutting face provided in the hollow portion, wherein the first abutting face forms a the first angle with respect to the second abutting face when viewed from a first direction perpendicular to the design face and forms the second angle with respect to a second abutting face when viewed from a second direction perpendicular to the longitudinal direction of the frame member and perpendicular to the first direction.

2. The vehicle door frame of claim 1, wherein the width of the design portion of the first frame member is greater than the width of the design portion of the second frame member and each of the first and second frame members has a depth corresponding to each said width and includes a recess extending in the longitudinal direction thereof.

3. The vehicle door frame of claim 1, wherein, in each of the first and second frame members, the second abutting face is perpendicular to the design face.

4. The vehicle door frame of claim 1, wherein, in each of the first and second frame members, the first abutting face and the second abutting face intersect with each other at a middle point in the extending direction of the flange portion in an extending direction of the flange portion.

5. The vehicle door frame of claim 1, wherein, in each of the first and second frame members, the design portion includes folds at both edges thereof in a width direction of the design portion.

6. The vehicle door frame of claim 5, wherein the folds of the first frame member are continued by the folds of the second frame member at the butting faces.

7. A method of making a vehicle door frame comprising:
   roll forming a metal plate into a first frame member and a second frame member, wherein each of the first frame member and the second frame member includes an end face, a design portion having a design face and a predetermined width in a direction perpendicular to a longitudinal direction of the frame member, a flange portion extending from the design portion on a side of the design portion opposite the design face, and a hollow portion provided at a distal end of the flange portion and including a hollow cross-sectional area, wherein the width of design portion of the first frame member differs from the width if the design portion of the second frame member;
   abutting the end face of the first frame member and the end face of the second frame member, in each of the first frame member and the second frame member, the end face includes a first planer abutting face provided in the design portion and a second planer abutting face provided in the hollow portion, wherein the first abutting face forms a first angle with respect to the second abutting face when viewed from a first direction perpendicular to the design face and forms a second angle with respect to the second abutting face when viewed from a second direction perpendicular to the longitudinal direction of the frame member and perpendicular to said first direction; and
   welding the first abutting face and the second abutting face of the first frame member to the first abutting face and the second abutting face of the second frame member.

* * * * *

UNITED STATES PATENT AND TRADEMARK OFFICE
CERTIFICATE OF CORRECTION

PATENT NO. : 7,891,137 B2
APPLICATION NO. : 11/992950
DATED : February 22, 2011
INVENTOR(S) : Katsuhiko Takeuchi Page 1 of 1

It is certified that error appears in the above-identified patent and that said Letters Patent is hereby corrected as shown below:

Claim 7, col. 10, line 34 - delete "roll".

Claim 7, col. 10, line 45 - "width if" should read --width of--.

Signed and Sealed this
Twenty-eighth Day of June, 2011

David J. Kappos
*Director of the United States Patent and Trademark Office*